Jan. 26, 1960 W. E. ENDREZZE ET AL 2,922,421
CABINET FIXTURE APPARATUS FOR FEMININE HYGIENE
Filed May 13, 1955 3 Sheets-Sheet 1

INVENTORS.
William Eugene Endrezze
Elden Leroy Reed

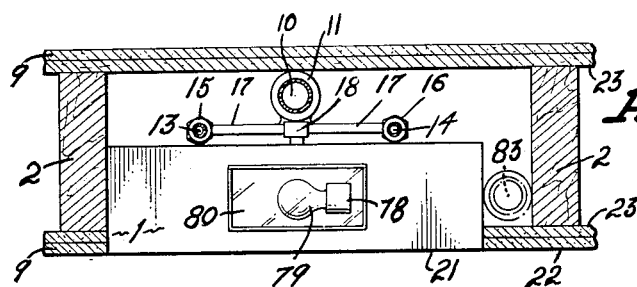
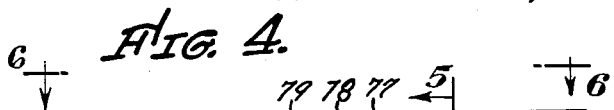
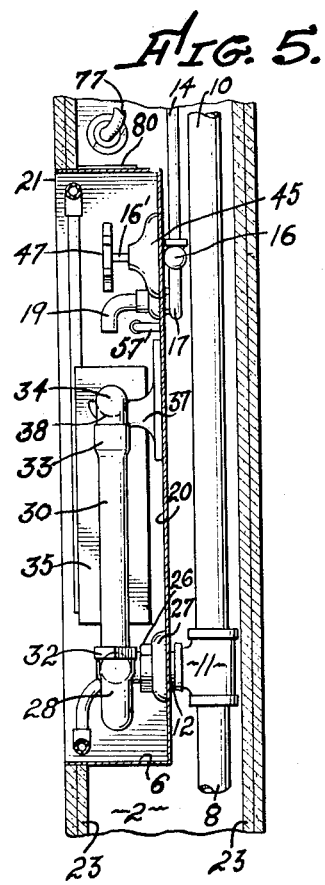
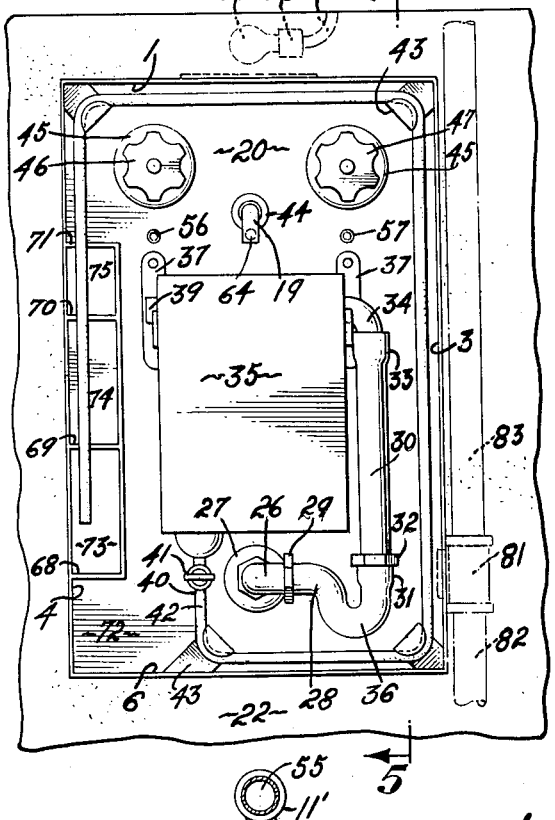
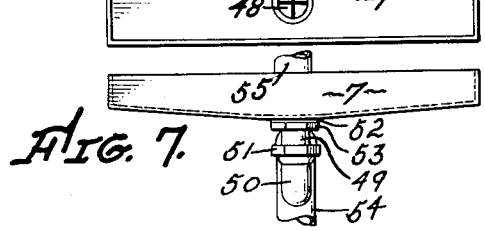

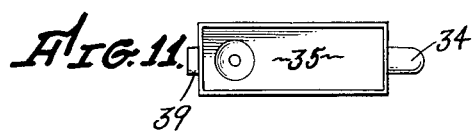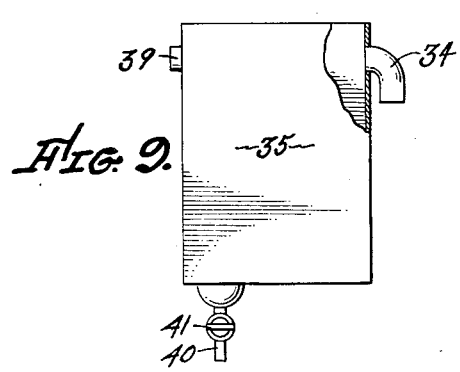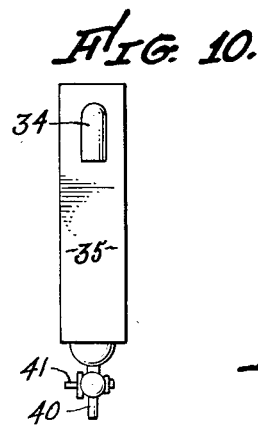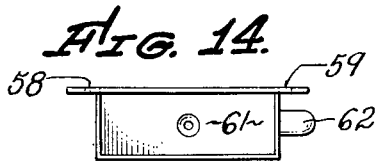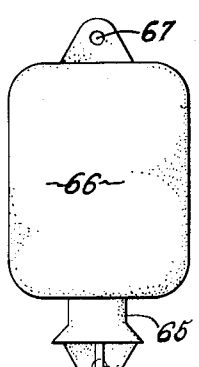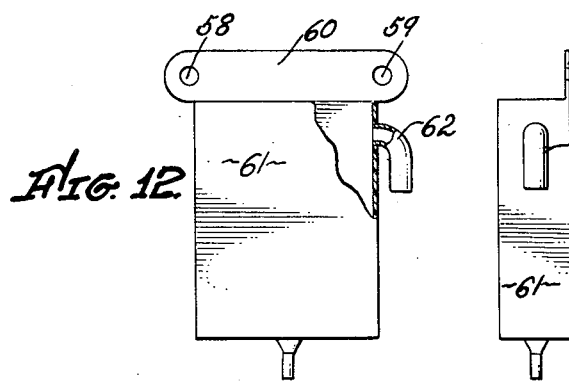

United States Patent Office 2,922,421
Patented Jan. 26, 1960

2,922,421

CABINET FIXTURE APPARATUS FOR FEMININE HYGIENE

William Eugene Endrezze and Elden Leroy Reed, Long Beach, Calif.

Application May 13, 1955, Serial No. 508,092

7 Claims. (Cl. 128—227)

This invention relates to fixture apparatus adapted to treat in the irrigation for feminine hygiene. While such irrigation is accomplished by means of douche bottles, tanks, hose and insertion tips generally hung upon the wall of a bath room, such personal equipment of the wife or lady of the house is embarrassing in an exposed condition when not in use hanging in a bath room that others are privileged to use, and is generally concealed in some location unhandy to the possessor of such equipment.

So the general problem is to design an ever ready (private) fixture confined within the wall of a bath room that is acceptable and satisfactory to the requirements of the wife for private use. To that end the fixture is a built-in lockable cabinet to house all the necessary equipment and medication required in the use of the apparatus for feminine hygiene.

One object is to devise a satisfactory construction for conveniently accomplishing the irrigation by travelers through the use of various portable solution containers provided in the form of plastic tanks and rubber bottles to fit the fixture cabinets of hotels and motels. The fixture cabinet provides hanger means that properly suspends these plastic irrigation tanks and bottles, beneath the water supply for immediate preparation in their use, and privately stored when not in use.

The major object is to devise sanitary connecting means between the waste piping leading to the sewer and the irrigation tank which is removably suspended upon brackets so that the overflow may drain into the waste piping of the building. Thus the general problem is to devise a satisfactory sanitary connection of indirect connected drainage for the irrigation tank by means of a loose fitted stand pipe to the overflow of the irrigation tank, yet sealed from the waste piping by a water seal trap through which the overflow drainage passes.

In such a fixture apparatus it is advantageous to provide a lockable cabinet door wherein such apparatus equipment is privately stored, inconspicuous, and accessible only to the possessor of the apparatus and equipment stored therein.

The novelty of the construction resides in the details that are accomplished, whereby some of the features of this invention include:

(1) The novel form of a private lockable cabinet fixture that is conveniently located upon the wall of a bathroom to which hot and cold water is supplied in the preparation of an irrigation for feminine hygiene; (2) a novel form of removable suspended irrigation tank for sanitation; (3) a novel form of sanitary overflow drainage in the preparation of the solution and temperature within the tank for use; (4) the novel form of the cabinet fixture which is adaptable to the use of portable plastic, and rubber irrigation containers for travelers use; (5) the novel form of composition irrigation containers that may be packaged to travelers for the cabinet fixture usage; and (6) the novel form of irrigation container supporting means of brackets and hangers provided within the cabinet fixture by which the apparatus is used.

The foregoing and several novel features of construction are embodied in the form of apparatus constituting the basis of the invention hereof. Other new and important features of construction will become apparent from the detailed description which follows.

The embodiment chosen for use in exemplification is illustrated in the accompanying drawings constituting a part of this specification, in which:

Figure 4 is an elevational plan view of the interior arrangement of the cabinet fixture as same appears recessed within the plastered wall of the bathroom with cover door and trim rim removed, to show the irrigation apparatus conveniently suspended beneath the water supply trim fittings, and the drainage system of the overflow;

Figure 5 is a side elevational view of the cabinet fixture as the same appears when taken on the line 5—5 of Figure 4. The illustration shows the bracket suspended irrigation apparatus directly beneath the water supply spout, also the overflow drainage trim fittings that connect to the waste piping and vent stack, all provided recessed between the finished walls that partition the bathroom;

Figure 6 is a top view of the cabinet fixture as same appears when taken on the line 6—6 of Figure 4. The illustration shows the light window through which the light from the light bulb shines into the cabinet, also the hot and cold water piping that supplies the cabinet fixture;

Figure 7 is a longitudinal side view of an alternate cabinet base, forming a drainage pan for the cabinet where such structure is necessary;

Figure 8 is a top view of the cabinet drainage pan that is similarly connected to the waste piping by sanitary trapped drainage fittings;

Figure 9 is a front elevational view of the preferred form of irrigation tank;

Figure 10 is a side elevational view of the irrigation tank in Figure 9;

Figure 11 is a top view of the irrigation tank illustrated in Figure 9;

Figure 12 is a front elevational view of a portable plastic irrigation tank showing the eyelet for suspension upon the hangers provided within the cabinet fixture;

Figure 13 is a side elevational view of the plastic portable tank shown in Figure 12;

Figure 14 is a top view of the plastic portable irrigation container shown in Figure 12; and Figure 15 is a side elevational view of a common hot water bottle serving as a douche apparatus, and for which the cabinet fixture is satisfactorily provided therefor.

Reference is now made to the drawings in detail. The construction illustrated as embodying the invention hereof includes:

Fixture cabinet

Figure 3:
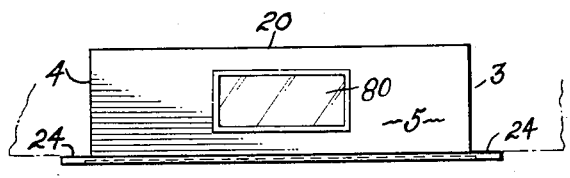
Figure 3 is a view as seen looking down at the top end of the lockable cabinet.
Figure 1:
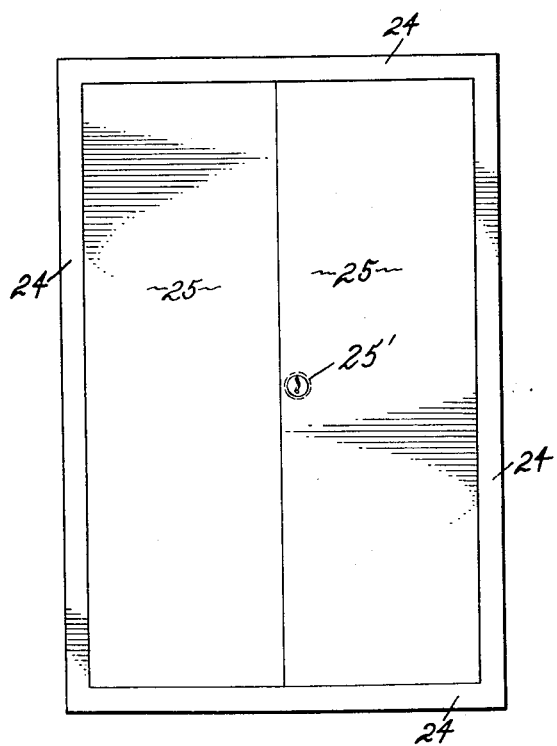
Figure 1 is a vertical front view of the lockable cabinet that houses the fixture and irrigation apparatus as the same appears when recessed within the wall of a bathroom flush with the plaster surface.
Figure 2:
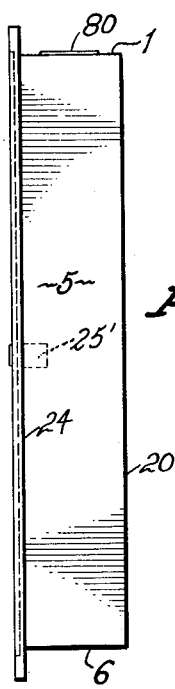
Figure 2 is a side elevational view of the lockable cabinet that shows the cabinet sufficiently shallow in depth to recess between the studding of the bathroom wall.
Figure 4C:
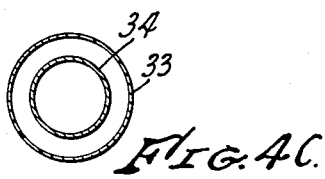
Figure 4c is a cross sectional view of the overflow and waste stand pipe as same appears when taken on the line 4c—4c of Figure 4a to show the method by which the members are indirectly connected.
Figure 4A:
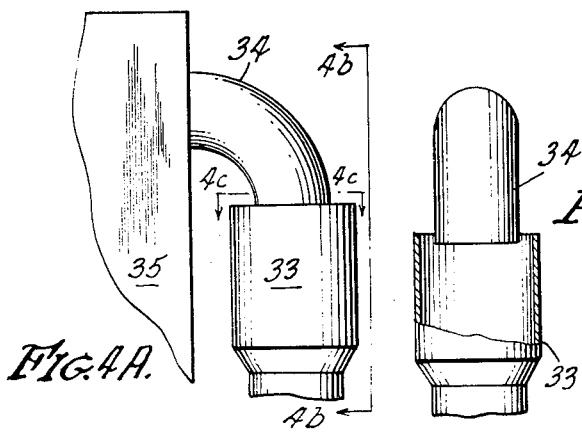
Figure 4a is an enlarged view of a portion of overflow bend 34 and swedged stand pipe 33 as seen in Figure 4.
Figure 4B:
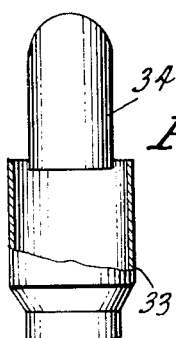
Figure 4b is a top view of Fig. 4a, showing the all around clearance of the indirectly connected members.

The fixture cabinet is sufficiently shallow in depth to be recessed within the wall of a bathroom as indicated by the top side 1 and sufficiently narrow to fit between standard studding 2 as indicated by the cabinet right hand side wall 3 and left hand side wall 4 that forms the lateral extremity of the cabinet proper 5, while the cabinet base 6 as illustrated in Figure 4 is flat, and where necessary may be provided with an alternate cabinet base in the form of a drainage pan 7 as illustrated in Figure 7 to be further described as the description proceeds. In practice the waste piping 8 is generally installed within the walls 9 during the roughing in stage of the plumbing that includes the vent pipe 10, a T fitting 11 connects the waste piping with the vent pipe while the horizontal opening 12 of the T provides for connecting the fixture drainage to the waste piping. The hot water pipe 13 and cold water pipe 14 are then roughed in to the proper elevation and valved as at 15 and 16 while a water mixing fitting 17 connects both hot and cold water to a junction fitting 18 to which the water supply spout 19 is later connected in the finish. The cabinet is then installed aligning the holes in the cabinet back 20 with the roughing in connections and set with the outer edges 21 of the cabinet to be flush with the finished wall 22 of the bathroom. The lathing 23 is applied to the studding and followed by the finished wall 22 which may be either plaster, tile, or terrazo finished. Having set and encased the cabinet, the cabinet trim rim 24 and lockable cabinet door 25 with lock 25' is affixed to the cabinet case which finishes the exterior cabinet face in a manner of stainless steel, brass, or chrome as desired.

Overflow drainage

Within the cabinet all fixture trim fittings are preferably chrome plated for durability and beauty. The angle fitting 26, one end of which passes through a chrome plated escutcheon 27 to screw into the horizontal opening 12 of the waste fitting T 11, while the opposite end thereof forms a union with the chrome plated water seal trap 28 by means of the slip nut 29 that locks the union, a chrome plated stand pipe 30 has its lower end fitted into the socket 31 provided upon the upright of the water seal trap and is made leak proof by a rubber gasket and the slip nut 32 that binds the stand pipe to the water seal trap, while the upper end 33 of the stand pipe is swedged to loosely receive the angle overflow 34 of the irrigation tank. Water from the irrigation tank 35 when filled to capacity in the act of adding hot and cold water to bring the solution to the proper temperature for use often creates a surplus which overflows, to pass down the stand pipe into the water seal trap and out into the waste piping of the building. A quantity of water remains to fill the goose neck 36 of the trap fitting that effectively acts to form a water seal against any sewer gas passing through the trap into the cabinet, and as the vent pipe is open to the outside atmosphere at its upper end the sewer gas is provided exit by such means.

Irrigation tank

Within the cabinet the fixture is provided with a pair of brackets 37 that extend from the back of the cabinet and is formed with a semi-circle recess 38 by which the supporting members 39 of the irrigation tank 35 are removably received in proper alignment of the overflow member within the swedged end of the stand pipe. The irrigation tank is preferably of a stainless steel sheet metal structure with an open top that is accessible for cleaning the interior thereof, while its bottom end is provided with a douche hose attachment 40 and a wing cock 41 by which the flow of the solution is drained from the tank. One end of the douche hose 42 is forced over the hose attachment 40 and a sufficient length of hose has its loose end provided with a thumb-pressed clip (not shown) to regulate the flow through the hose and the insertion tip (not shown) of various forms preferred by the user thereof. As the irrigation tank is suspended upon brackets it is readily removed from the cabinet for cleaning and in proper alignment for the overflow when replaced, which also centers the irrigation tank under the water supply spout 19 by which the tank is supplied with hot and cold water. The hose when not in use is conveniently wrapped over the hose hangers 43 and out of the way.

Water supply

A hot water supply pipe 13 enters the valve 15 whose valve stem 15' extends through a hole provided upon the cabinet back while a water mixing fitting 17 connects the valve with the junction fitting 18. A cold water supply pipe 14 enters the valve 16 whose valve stem 16' extends through a hole provided upon the cabinet back while a water mixing fitting 17 connects the valve with a junction fitting 18, thus hot and cold water is led to this junction fitting by manipulation of the valves. A chrome plated trim fitting 19 in the form of a water spout passes through a chrome plated escutcheon 44 to screw into the junction fitting and through which both hot and cold water passes. The hot and cold water valve stems are finished by a chrome plated escutcheon 45 that seats against the cabinet back to cover the hole through which the valve stems pass, a chrome plated valve handle 46 for the hot water valve, and a chrome plated valve handle 47 for the cold water valve are screwed to the valve stems 16' and 16' to complete the trim of the water supply system that serves the irrigation apparatus. By turning valve handles 46 and 47 as desired hot and cold water discharges from the water supply spout 19 to charge the irrigation tank 35 to the proper temperature for use. Any excess water drawn in the process of tempering the solution for use passes out through the overflow system provided by the fixture.

Cabinet drain pan

In an alternate form of cabinet fixture the cabinet base 6 is formed to receive a drain pan 7 as shown in Figures 7 and 8. Any wash water which spills or drips from the hose would be received by the drain pan to pass out the strainer 48 and down the tail piece 49 coupled to the water seal trap 50 by the slip nut 51. The strainer 48 is secured leak-proof by the gasket 52 and the compression nut 53, while the water seal trap 50 is directly connected to the waste piping 54 by a T fitting such as at 11, Figure 5, and then vented by a vent pipe 55 which serves to exit the sewer gas as previously described.

Such a drainage pan would best serve the public in hotels and motels where less care is exercised than in the home.

Portable plastic tanks

Where travelers stop over concerns a few days or a few weeks such permanent irrigation tanks of the home are not adaptable because of unsanitary conditions resulting from a variety of character usage in hotels and motels. Women are reluctant to use apparatus that others have used, and prefer to carry their own or be supplied with a new or packaged apparatus adaptable for use within the cabinet fixture of the hotel or motel. To that end the fixture cabinet is provided with hangers 56 and 57 to receive the eyelets 58 and 59 provided upon the plastic flap 60 by which the tank 61 is suspended directly beneath the water supply spout 19, an overflow 62 is provided that serves the same purpose as previously described for the irrigation tank of the home. The hose, flow regulator, and insertion tips are a personal concern and generally personal equipment that is readily adapted to the connector provided upon the plastic tank.

The cabinet fixture for travelers then serves in the same manner as the cabinet fixture serves for the wife in her home.

Hot water douche apparatus

Generally hot water bottles are supplied with a douche hose adaptor that is screwed to the fill neck of the hot water bottle then hung up-side-down in the use of the apparatus. The hot water eyelet 63 is passed over the hanger 64 of the cabinet fixture that then suspends the fill neck 65 of the bottle 66 directly beneath the water supply spout 19 by which the bottle may be charged for use thereof. The douche hose adaptor is then screwed to the fill neck and the bottle removed from the hanger and turned up-side-down passing the eyelet 67 over the hanger 64 that is shown by the dotted circle drawn upon the water supply spout 19. The hot water bottle douche apparatus suspended within the cabinet fixture then serves in the same manner for use as other containers heretofore described and to which the cabinet fixture readily adapts itself.

*Fixture cabinet shelving*

Feminine hygiene requires a considerable amount of medication and personal equipment that is private to the wife or possessor thereof. The cabinet fixture provides for safe and private keeping thereof by means of the shelves 68, 69, 70 and 71 that form the compartments 72, 73, 74 and 75 in which the various private equipment may be stored behind the cabinet door 25 and locked by the door lock 25'.

*Cabinet fixture lighting*

In the preparation of the solution for an irrigation, light is required within the cabinet. A space provided above the cabinet has a pair of electrical leads 77 that enters an electrical socket 78 through which an electrical bulb 79 receives current to produce light. The light then passes through the window 80 to light up the interior of the cabinet for any visual manipulation that may be required therein. This provides a method that confines the electrical current unaccessible to a person in contact with water.

*Alternate waste piping*

For shallow walls an alternate form of waste piping in the plumbing of the fixture requires the waste piping to the side of the cabinet as shown by the dotted lines in Figures 4 and 6, providing a means by which the sanitary drainage fittings pass through the side 3 of the cabinet to be directly connected to the T fitting 81 that connects the waste pipe 82 and the vent pipe 83 in a manner similar to out the back method as heretofore defined.

The embodiments of the invention in which an exclusive property or privilege is claimed, are defined as follows.

We claim:

1. In a cabinet fixture for feminine hygiene, comprising: a fixture back member with top, bottom, and sidewall extending therefrom flush fittingly recessed within a bathroom wall, a waste discharge piping and T member exterior of said fixture member with a vent pipe stack coupled to the T venting to the atmosphere the sewer gas within said waste piping; hot and cold water supply piping serving said fixture with a water supply spout centered in the upper portion of said fixture adjacent manually operated hot and cold water supply valves extending through said back member coupling said hot and cold water supply piping to said water supply spout; a removably mounted open top solution tank with bottom drain stop and hose member suspended within said fixture cabinet with the top of the tank positioned in spaced relation below the end of said water supply spout; said solution tank characterized by suspension brackets and tank support members in support of said tank within said cabinet fixture with at least one such supporting bracket secured to said fixture back and engaging at least one such tank support member removably mounting said solution tank in proper position suspended upon said fixture back, an overflow spout extending from the upper portion of said tank provided to drain off the excess fluid charging said tank, a water seal trap and fixture drain fittings one end of which is directly coupled to said T member with the opposite end thereof through the lower portion of said fixture back space coupled to said overflow spout by indirect waste and overflow connection receiving the excess fluid discharged from the tank, thereby providing sanitary bacteria free suspension of said solution tank.

2. In a cabinet fixture apparatus according to claim 1, including; a drainage pan for the cabinet by which spills and wash water is received; a strainer fitting that passes through said drainage pan to form a tail piece beneath; a series of sanitary drainage fittings with one end directly connected to said tail piece and having its opposite end directly connected to the waste piping provided in the plumbing of said cabinet fixture, and a water seal trap for said drainage fittings provided as means by which sewer gas is restrained from entering the cabinet.

3. In a cabinet fixture for feminine hygiene according to claim 1, wherein said fixture back includes hot and cold water valve aperture means through said fixture back disposed in elevation to the right and left above said suspended solution tank, said valve operating means extending through said apertures coupled to said hot and cold water supply for individual control in the tempering of said suspended solution tank.

4. In a cabinet fixture for feminine hygiene according to claim 1, wherein said fixture back includes a water supply spout aperture means through said fixture back, said aperture in alignment above said suspended solution tank.

5. In a cabinet fixture for feminine hygiene according to claim 1, wherein the application of said fixture back includes round headed tank hanger means rigidly fixed to said fixture back and extending therefrom, said hanger means in alignment across said fixture back providing means engaging tank supporting eyelets provided by the tank by which various forms of overflow and open top irrigation containers are removably suspended upon said hangers with the open top positioned in spaced relation below said water supply spout and having said overflow means in spaced relation indirectly connected to said waste discharge means.

6. In a cabinet fixture apparatus for feminine hygiene according to claim 1, wherein said cabinet includes a drain aperture through the lower portion of said fixture back, a series of sanitary drain trim fittings within the confines of said cabinet one end of which indirectly connects the overflow from said irrigation tank with the opposite end thereof through said drain aperture directly connected to said waste piping exterior of said cabinet including said vent stack provided in the plumbing of said fixture apparatus, whereby said water seal trap provides means by which sewer gas within said waste piping is restrained from entering the confines of said fixture cabinet.

7. In a cabinet fixture apparatus for feminine hygiene according to claim 1, wherein said suspended solution tank with bottom drain stop and hose member includes a hose attached to said hose member for feminine use of said removably mounted solution tank, cabinet trim with a lockable door to flush said recessed fixture with the bathroom wall and make private said fixture apparatus provided within said cabinet.

References Cited in the file of this patent

UNITED STATES PATENTS

| | | |
|---|---|---|
| 1,595,791 | Lantieri | Aug. 10, 1926 |
| 1,689,746 | Norton | Oct. 30, 1928 |
| 1,697,229 | De Mott | Jan. 1, 1929 |
| 1,732,528 | O'Rourke et al. | Oct. 22, 1929 |
| 1,745,209 | Donovan | Jan. 28, 1930 |
| 1,929,785 | McLaughlin | Oct. 10, 1933 |
| 2,000,981 | Parsons | May 14, 1935 |
| 2,617,416 | Condit | Nov. 11, 1952 |